United States Patent
Jo et al.

(10) Patent No.: US 11,891,027 B2
(45) Date of Patent: Feb. 6, 2024

(54) DRUM BRAKE APPARATUS

(71) Applicant: HYUNDAI MOBIS CO., LTD., Seoul (KR)

(72) Inventors: Chi Hoon Jo, Yongin-si (KR); Byeung Su Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 233 days.

(21) Appl. No.: 17/356,115

(22) Filed: Jun. 23, 2021

(65) Prior Publication Data

US 2021/0394732 A1 Dec. 23, 2021

(30) Foreign Application Priority Data

Jun. 23, 2020 (KR) .................. 10-2020-0076097

(51) Int. Cl.

| F16D 65/22 | (2006.01) |
|---|---|
| B60T 13/58 | (2006.01) |
| B60T 13/74 | (2006.01) |
| B60T 1/06 | (2006.01) |
| F16D 51/22 | (2006.01) |
| F16D 51/24 | (2006.01) |
| F16D 51/00 | (2006.01) |
| F16D 121/04 | (2012.01) |
| F16D 121/24 | (2012.01) |

(Continued)

(52) U.S. Cl.
CPC .......... B60T 13/588 (2013.01); B60T 13/746 (2013.01); F16D 65/22 (2013.01); *B60T 1/067* (2013.01); *F16D 51/22* (2013.01); *F16D 51/24* (2013.01); *F16D 2051/005* (2013.01); *F16D 2121/04* (2013.01); *F16D 2121/24* (2013.01); *F16D 2125/40* (2013.01); *F16D 2127/02* (2013.01); *F16D 2131/00* (2013.01)

(58) Field of Classification Search
CPC ...... B60T 1/067; B60T 13/588; B60T 13/746; F16D 51/22; F16D 51/24; F16D 65/22; F16D 2051/005; F16D 2121/04; F16D 2121/24; F16D 2125/40; F16D 2131/00
See application file for complete search history.

(56) References Cited

U.S. PATENT DOCUMENTS

| 3,613,841 A * | 10/1971 | Newstead ............... B60T 1/005 192/114 R |
|---|---|---|
| 2019/0344761 A1* | 11/2019 | Cho ........................ F16D 65/66 |

(Continued)

FOREIGN PATENT DOCUMENTS

KR    10-2018-0047519 A    5/2018

*Primary Examiner* — Nicholas J Lane
(74) *Attorney, Agent, or Firm* — MORGAN, LEWIS & BOCKIUS LLP

(57) ABSTRACT

A drum brake apparatus includes a housing; a main braking unit installed on one part of the housing, and driven by a hydraulic pressure and pressing a shoe, during main braking; and a parking braking unit installed on the other part of the housing, and driven by an electromotive force of an actuator and pressing the shoe, during parking braking, the parking braking unit includes a bevel gear section disposed in the housing while having a structure of a bevel gear, and rotated in association with the actuator; and a rod section connected with the bevel gear section, and moved out of the housing in association with the bevel gear section and pressing the shoe.

14 Claims, 11 Drawing Sheets

(51) Int. Cl.
　　　*F16D 125/40*　　　(2012.01)
　　　*F16D 127/02*　　　(2012.01)
　　　*F16D 131/00*　　　(2012.01)

(56) References Cited

U.S. PATENT DOCUMENTS

2020/0055505 A1* 　2/2020 　Choi ................... B60T 13/741
2020/0056667 A1* 　2/2020 　Choi ..................... B60T 1/067
2021/0394732 A1* 12/2021 　Jo ....................... B60T 13/588
2021/0396281 A1* 12/2021 　Jo ......................... F16D 51/22
2021/0396289 A1* 12/2021 　Jo ......................... F16D 65/22

* cited by examiner

SECTION A-A'

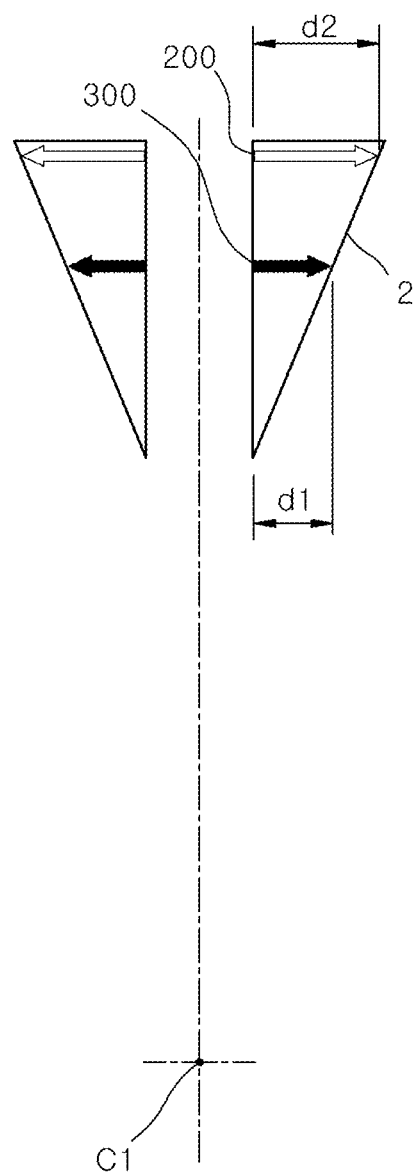

SECTION B-B'

DRUM BRAKE APPARATUS

CROSS-REFERENCE TO RELATED APPLICATION

This application claims the benefit of priority to Korean Patent Application No. 10-2020-0076097 filed on Jun. 23, 2020 in the Korean Intellectual Property Office, the entire disclosure of which is incorporated herein by reference for all purposes.

BACKGROUND

Field

Exemplary embodiments of the present disclosure relate to a drum brake apparatus, and more particularly, to a drum brake apparatus which generates a braking force through friction with a drum rotating together with a wheel.

Discussion of the Background

In general, a drum brake refers to an apparatus which generates a braking force through friction with a drum rotating together with a wheel. That is to say, the drum brake refers to an apparatus which acquires a braking force by rubbing a shoe, to which a friction member is attached, against a drum through using a hydraulic pressure (main braking) or using a cable connected to a parking brake lever (parking braking).

A conventional drum brake includes a drum, a pair of shoes which are disposed on a back plate to face the inner circumferential surface of the drum and each have a friction member attached to the outer circumferential surface thereof, and a wheel cylinder for main braking, which moves the shoes outward by receiving a hydraulic braking pressure. The drum brake further includes an actuation lever for a parking brake, which has one end axially coupled to the shoes and the other end connected through a cable to a parking brake lever installed laterally of a driver's seat. Thus, when the parking brake lever is pulled, parking braking is mechanically performed.

In the conventional art, a main brake device which performs main braking and a parking brake device which performs parking braking are separately fabricated and installed. Since the main brake device and the parking brake device are separately fabricated and managed, assembly positions capable of securing a clearance in consideration of the interference between the main brake device and the parking brake device need to be set and adjusted depending on a specification, and then design and assembly need to be performed. Therefore, due to inconveniences caused therefrom, the productivity may be degraded and the fabrication cost may increase.

Therefore, there is a need to solve such a problem.

A background art of the present disclosure is disclosed in Korean Patent Application Publication No. 2018-0047519 (published on May 10, 2018 and entitled "Drum Brake for Vehicle").

SUMMARY

Various embodiments are directed to an integrated type drum brake apparatus capable of performing main braking and parking braking together.

In an embodiment, a drum brake apparatus may include: a housing; a main braking unit disposed on a first portion of the housing, the main braking unit configured to, during main braking, driven by a hydraulic pressure and pressing a shoe; and a parking braking unit disposed on a second portion of the housing, the parking braking unit configured to, during parking braking, driven by an electromotive force of an actuator and to press the shoe, the parking braking unit including: a bevel gear disposed in the housing, the bevel gear configured to rotate in association with the actuator; and a rod connected with the bevel gear, the rod disposed to be reciprocating in and out of the housing in association with the bevel gear while pressing the shoe.

The bevel gear may include: a driving gear connected with the actuator; and a driven gear disposed on the same horizontal line as the driving gear, meshed with the driving gear, and threadedly coupled with the rod.

The driving gear may be disposed parallel to a rotation center of a back plate, and the driven gear may be disposed in a tangential direction on the same radial extension line as the main braking unit with respect to the rotation center of the back plate.

The rod may include: a rotation rod connected with the driven gear on the same shaft; and a push rod threadedly coupled around the rotation rod, and disposed to be reciprocating in and out of the housing in association with rotation of the rotation rod.

The housing may include: a housing body which comprises; a piston receiving section at a first side of the housing body and having a hollow structure in which the main braking unit is disposed; and a rod receiving body at a second side of the housing body, the rod receiving body having a hollow structure in which the parking braking unit is disposed.

The housing body may further include: a body part integrally connected with the piston receiving body and the rod receiving body; a fastening part disposed on the body part to be fastened to a back plate; and a foreign matter introduction prevention part configured to be coupled to a side of the body part having openings of the piston receiving body and the rod receiving body, the foreign matter introduction prevention part configured to cover an edge portion of the piston receiving body and an edge portion of the rod receiving body.

The fastening part may include: a fastening locking portion defined at each side of the body part, and configured to be fastened to the back plate together with the actuator by a locking member; and a movement preventing portion protruding on the body part so as to correspond to the main braking unit and extend through a through hole of the back plate.

The foreign matter introduction prevention part may include: a sealing cover disposed to cover a side of the body part; a piston sealing portion having hollow structure at a first side of the sealing cover, an edge of the piston sealing portion connected with the main braking unit; a rod sealing portion having a hollow structure at a second side of the sealing cover, an edge of the rod receiving portion connected with the parking braking unit; and a body fixing portion continuously disposed along the edge of the sealing cover and fixedly connected to the body part.

The piston receiving body may include: a cylinder, having a circular space shape, disposed in the housing body and accommodating the main braking unit; and a hydraulic flow path, through which a fluid is supplied in the cylinder, extending from an outer surface of the housing body to the cylinder part.

The rod receiving body may include: a rod cylinder, having a circular space shape, disposed in the housing body and accommodating the parking braking unit; and a driving shaft receiving part, through which an output shaft of the actuator extends and is connected to the parking braking unit, disposed at a predetermined distance from the piston receiving body and communicating with the rod cylinder part.

The piston receiving body and the rod receiving body may be disposed on the same radial extension line with respect to a rotation center of a back plate, and the actuator, which is disposed parallel to the rotation center of the back plate, may be disposed on the same radial extension line as a chassis is configured to support a center portion of the back plate.

The main braking unit may include: a piston disposed at an end of the housing, and configured to reciprocate in and out of the housing by a hydraulic pressure so as to press the shoe; and an elastic member disposed in the housing, the elastic member configured to reduce an impact force applied to the piston returning into the housing.

According to the embodiments of the present disclosure, the drum brake apparatus may disclose an integrated main braking and parking braking structure in which a main braking unit and a parking braking unit are coupled to each other in one housing. Thus, a main bake device and a parking brake device may be simultaneously installed through a simple process of installing a housing on a back plate.

Therefore, according to the embodiments of the present disclosure, when compared to the conventional art in which a main brake device and a parking brake device are separately fabricated and managed, assembly positions capable of securing a clearance in consideration of the interference between the main brake device and the parking brake device are set and adjusted depending on a specification and then design and assembly are performed, a manufacturing process may be simplified and a distance between the main braking unit and the parking braking unit may be further decreased. As a consequence, it is possible to realize size and weight reduction and improve space utilization efficiency.

In addition, according to the embodiments of the present disclosure, by applying a bevel gear section as power transmission means for receiving an electromotive force from an actuator, it is possible to realize a layout of a two-row structure including a first row corresponding to a rotation axis of the main braking unit and a second row corresponding to rotation axes of a driving gear and a driven gear.

Therefore, according to the embodiments of the present disclosure, compared to a case where a three-row structure is realized when worm wheel gears are applied, it is possible to significantly reduce the volumes of the parking braking unit and the housing which receives the parking braking unit. As a consequence, it is possible to realize size and weight reduction and further improve space utilization efficiency.

Also, according to the embodiments of the present disclosure, when compared to a case in which the worm wheel gears are applied, the driving gear and the actuator connected with the driving shaft on the same shaft may be disposed closer to the main braking unit, that is, closer to a rotation center of the back plate, and thus, the degree of freedom in layout may be improved.

BRIEF DESCRIPTION OF THE DRAWINGS

FIG. 9A and FIG. 9B are a conceptual view to assist in the explanation of tolerances depending on the disposition of a main braking unit and the parking braking unit in the drum brake apparatus in accordance with the embodiment of the present disclosure.

DETAILED DESCRIPTION OF THE ILLUSTRATED EMBODIMENTS

Hereinafter, a drum brake apparatus will be described below with reference to the accompanying drawings through various examples of embodiments. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosure set forth herein.

Figure 1:
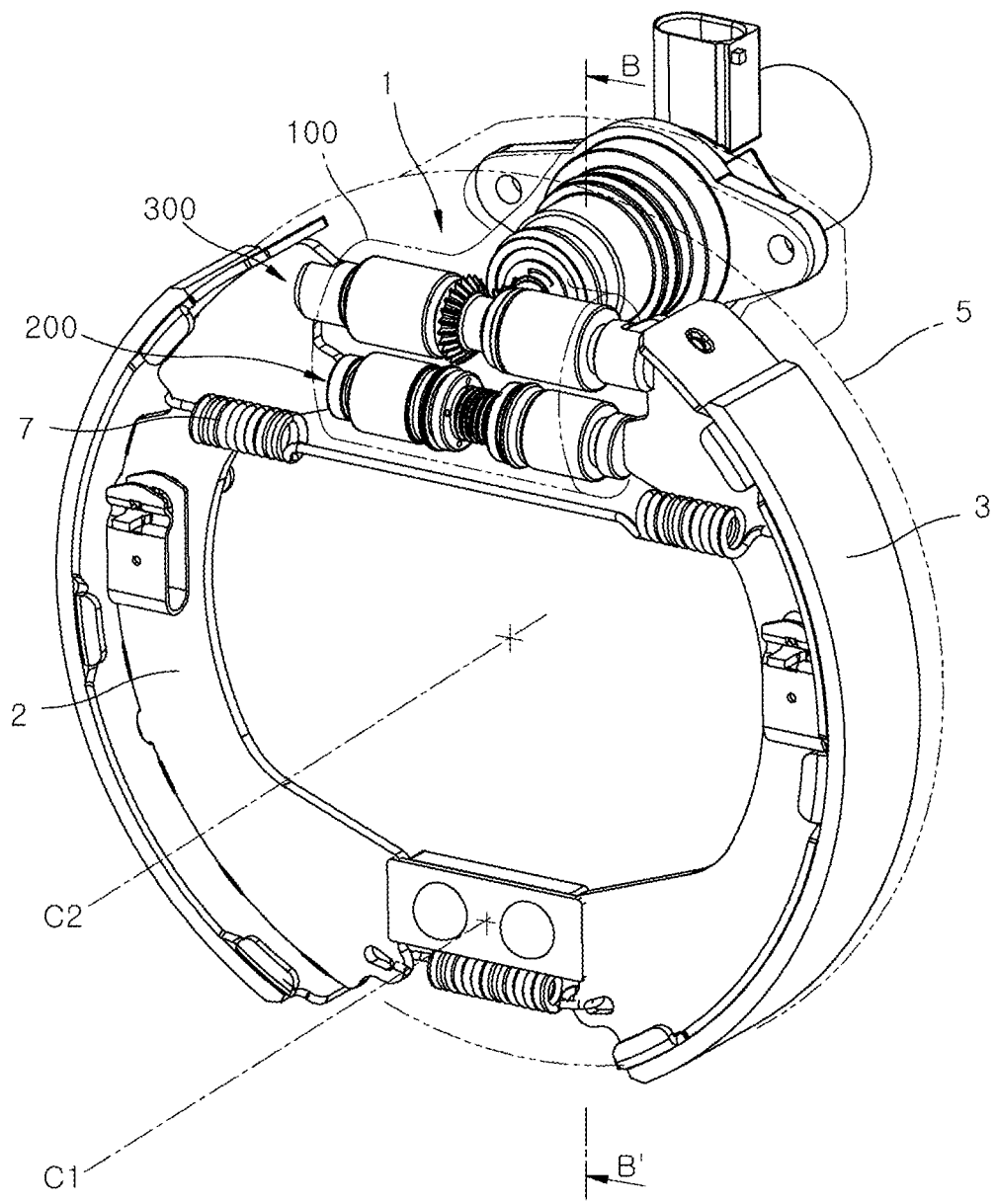
FIG. 1 is a perspective view schematically illustrating an installation state of a drum brake apparatus in accordance with an embodiment of the present disclosure.
Figure 2:
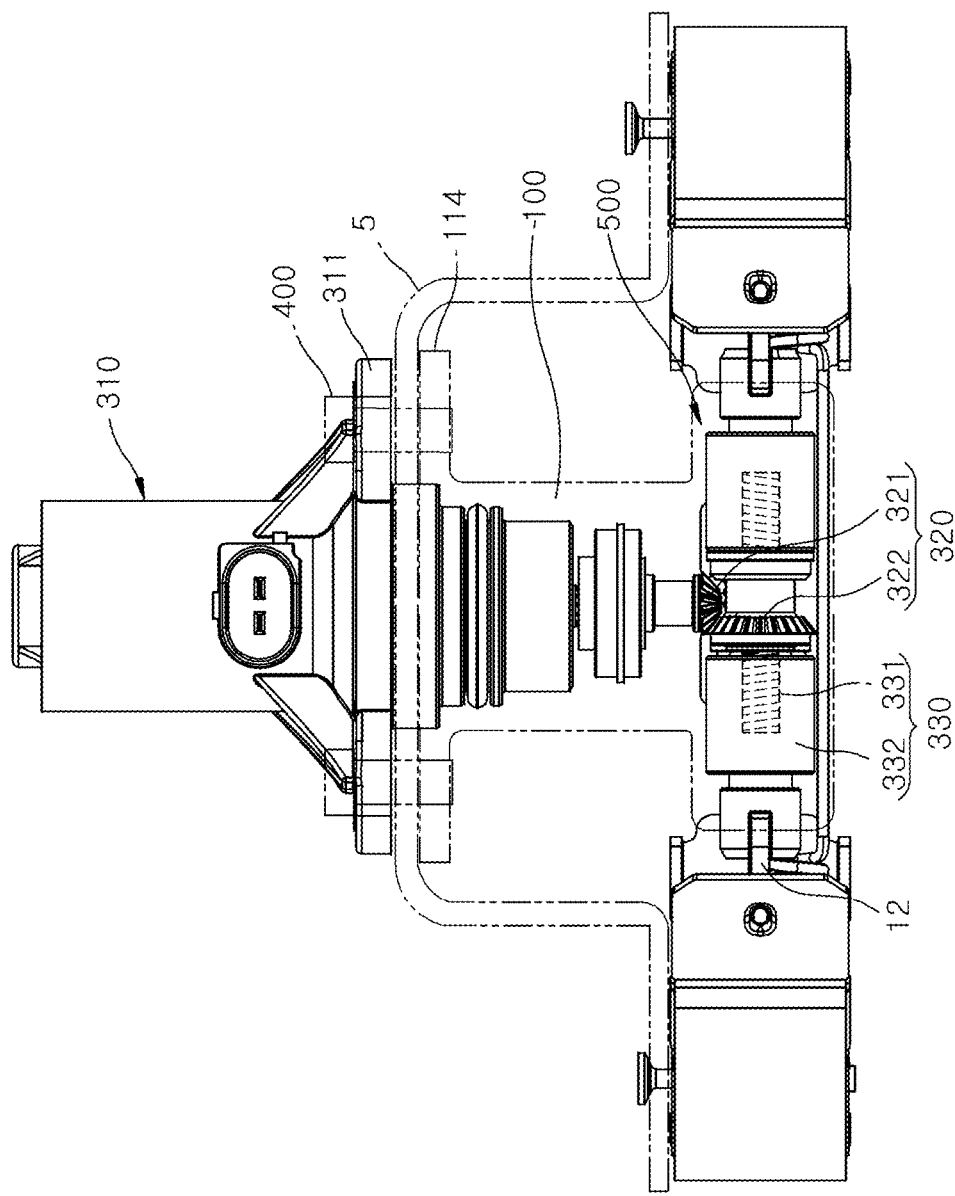
FIG. 2 is a plan view schematically illustrating the installation state of the drum brake apparatus in accordance with the embodiment of the present disclosure.
Figure 3:
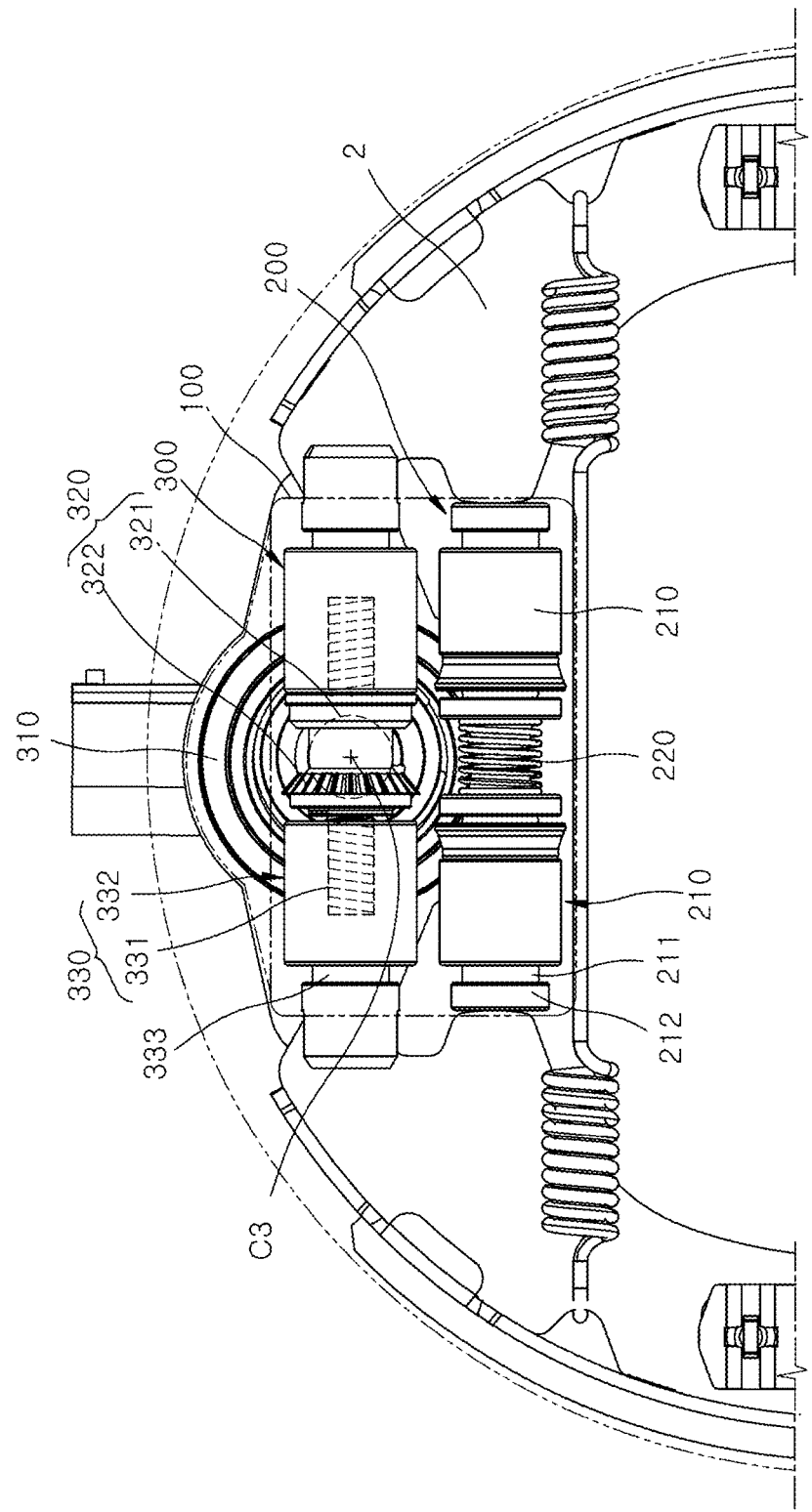
FIG. 3 is a front view schematically illustrating the installation state of the drum brake apparatus in accordance with the embodiment of the present disclosure.

FIG. 1 is a perspective view schematically illustrating an installation state of a drum brake apparatus in accordance with an embodiment of the present disclosure, FIG. 2 is a plan view schematically illustrating the installation state of the drum brake apparatus in accordance with the embodiment of the present disclosure, and FIG. 3 is a front view schematically illustrating the installation state of the drum brake apparatus in accordance with the embodiment of the present disclosure.

Referring to FIGS. 1 to 3, a drum brake apparatus 1 in accordance with an embodiment of the present disclosure includes a housing 100, a main braking unit 200, a parking braking unit 300, and a locking member 400.

The housing 100 is disposed between a pair of left and right shoes 2. The main braking unit 200 is installed on one part of the housing 100, and is driven by a hydraulic pressure upon main braking so as to press the shoes 2. The parking braking unit 300 is installed on the other part of the housing 100, and is driven by an electromotive force upon parking braking so as to press the shoes 2. Both ends of the main braking unit 200 are installed so as to be engaged with one side portions of the shoes 2, and the parking braking unit 300 is installed so as to be engaged with the other side portions of the shoes 2 with a predetermined distance from the main braking unit 200.

The locking member 400 fastens the housing 100 and an actuator 310 of the parking braking unit 300 at a predetermined position on a back plate 5. The locking member 400 is locked to the housing 100 by passing through the actuator 310 and the back plate 5, and thereby, couples the actuator 310, the back plate 5 and the housing 100 to one another.

Figure 4:
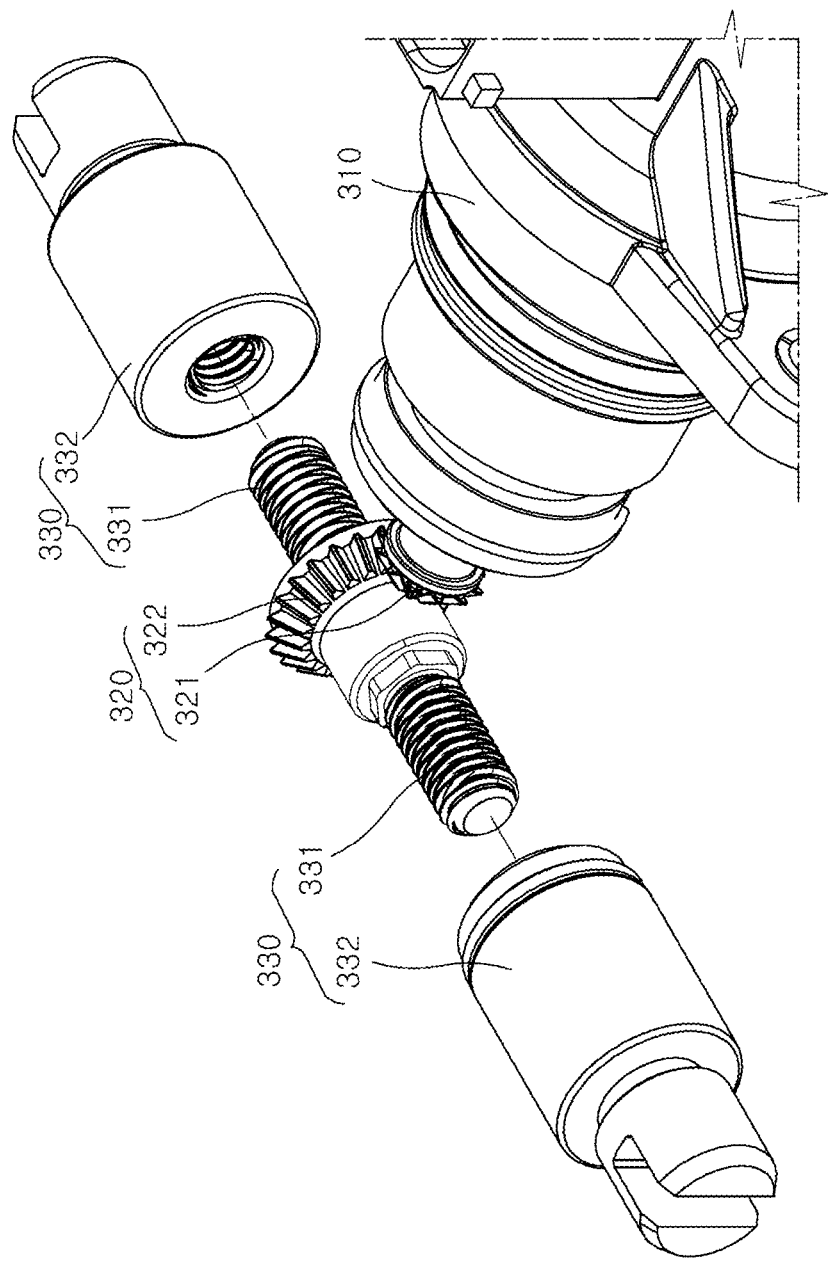
FIG. 4 is an exploded perspective view illustrating a parking braking unit of the drum brake apparatus in accordance with the embodiment of the present disclosure.
Figure 5:
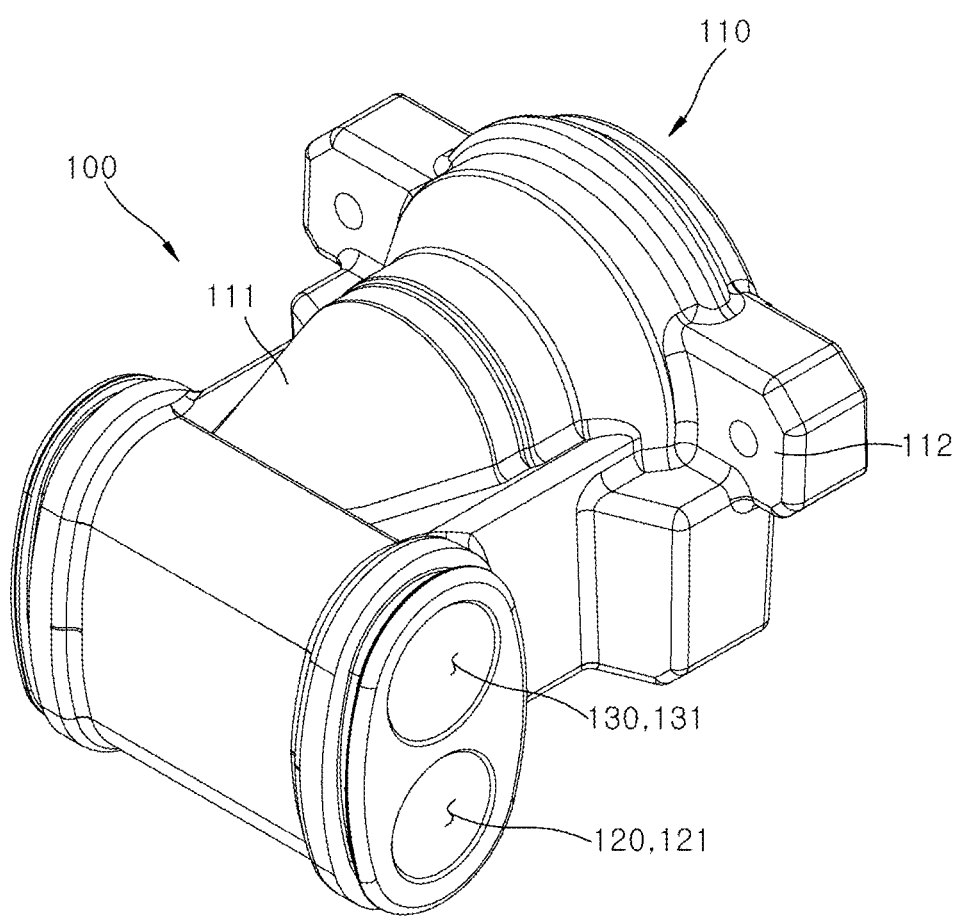
FIG. 5 is a front perspective view illustrating a housing of the drum brake apparatus in accordance with the embodiment of the present disclosure.
Figure 6:
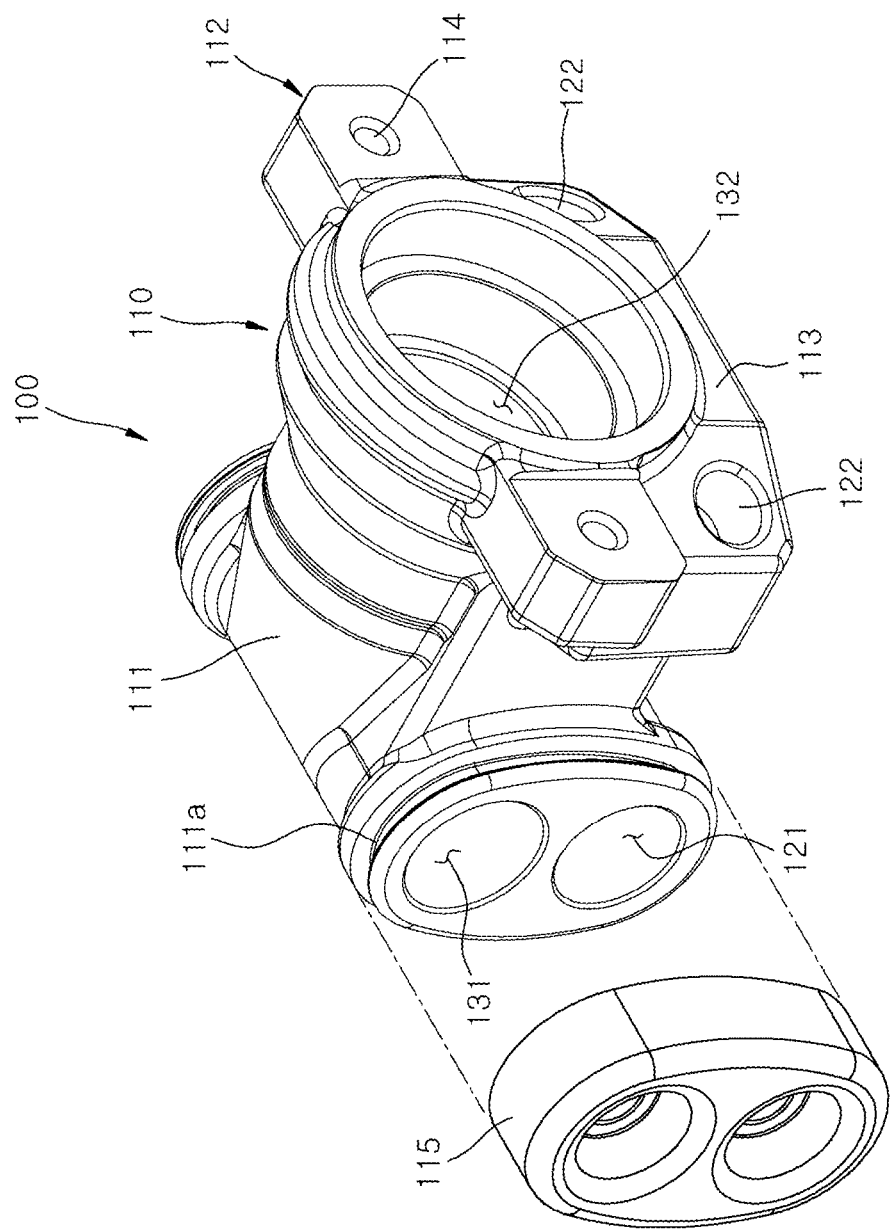
FIG. 6 is a rear perspective view illustrating the housing of the drum brake apparatus in accordance with the embodiment of the present disclosure.

FIG. 4 is an exploded perspective view illustrating a parking braking unit of the drum brake apparatus in accordance with the embodiment of the present disclosure, FIG. 5 is a front perspective view illustrating a housing of the drum brake apparatus in accordance with the embodiment of the present disclosure, and FIG. 6 is a rear perspective view illustrating the housing of the drum brake apparatus in accordance with the embodiment of the present disclosure.

Referring to FIGS. 1, 5 and 6, the housing 100 in accordance with the embodiment of the present disclosure includes a housing section 110, a piston receiving section 120, and a rod receiving section 130.

The housing section 110, as a section which forms a basic framework of the housing 100, has the shape of a block. The piston receiving section 120, as a section in which the main braking unit 200 is installed, is formed to be hollow in one part of the housing section 110. The rod receiving section 130, as a section in which the parking braking unit 300 is installed, is formed to be hollow in the other part of the housing section 110 with a predetermined distance from the piston receiving section 120. The housing section 110 in accordance with the embodiment of the present disclosure includes a body part 111, a fastening part 112, and a foreign matter introduction prevention part 115.

The body part 111 serves as a device part which forms the body of the housing section 110, and the piston receiving section 120 and the rod receiving section 130 are formed in the body part 111 to be hollow. The piston receiving section 120 and the rod receiving section 130 are formed in the body part 111 to extend in a lateral direction and be open at both ends thereof.

The body part 111 and the actuator 310 are disposed on one side and the other side, respectively, of the back plate 5 with the back plate 5 interposed therebetween. Hereinafter, for the sake of convenience in explanation, disposition relationships among components, directions and so forth will be described by setting the one side of the back plate 5, on which the body part 111 is disposed, as the front and setting the other side of the back plate 5, on which the actuator 310 is disposed, as the rear.

The fastening part 112, as a device part which is fastened to the back plate 5, is formed on a rear surface of the body part 111 which abuts the back plate 5. Referring to FIGS. 5 and 6, the fastening part 112 in accordance with the embodiment of the present disclosure includes a fastening locking portion 114 and a movement preventing portion 113.

The fastening locking portion 114, as a device portion which is fastened to the back plate 5 by the locking member 400, is formed on each side of the body part 111 to extend in a front-and-rear direction. The fastening locking portion 114 has the structure of a hole or a groove, and an internal thread to which the locking member 400 such as a bolt may be threadedly locked is formed on an inner diameter portion of the fastening locking portion 114.

Referring to FIG. 2, the locking member 400 is locked to the fastening locking portion 114 by sequentially passing through a locking portion 311, formed on each side of the actuator 310, and the back plate 5, and thereby, fastens the body part 111 and the actuator 310 to one surface and the other surface, respectively, of the back plate 5. As the locking member 400 is locked in this way, the body part 111 and the actuator 310 are tightly installed on a front surface and the rear surface, respectively, of the back plate 5 while being coupled to each other.

The movement preventing portion 113 is projectedly formed at a position on the body part 111, corresponding to the main braking unit 200. A through hole 6 for engagement with the movement preventing portion 113 is formed through the back plate 5 (see FIG. 10). For example, the through hole 6 may have a horizontally extending rectangular shape, and the movement preventing portion 113 may have a rectangular cross-sectional shape corresponding to the shape of the through hole 6. As the movement preventing portion 113 has the shape corresponding to the through hole 6 and is fitted into the through hole 6, the movement of the movement preventing portion 113 in a top-and-bottom direction and a left-and-right direction in the state in which the movement preventing portion 113 is fastened to the back plate 5 is stably prevented.

The movement of the body part 111 in the front-and-rear direction, that is, the movement of the body part 111 in a direction of an output shaft of the actuator 310, is stably prevented by the locking member 400 locked to the fastening locking portion 114 at the front through the back plate 5 from the rear of the actuator 310, and the movement of the actuator 310 in a radial direction is stably prevented by the movement preventing portion 113 fitted into the through hole 6 formed in the back plate 5.

Figure 7:
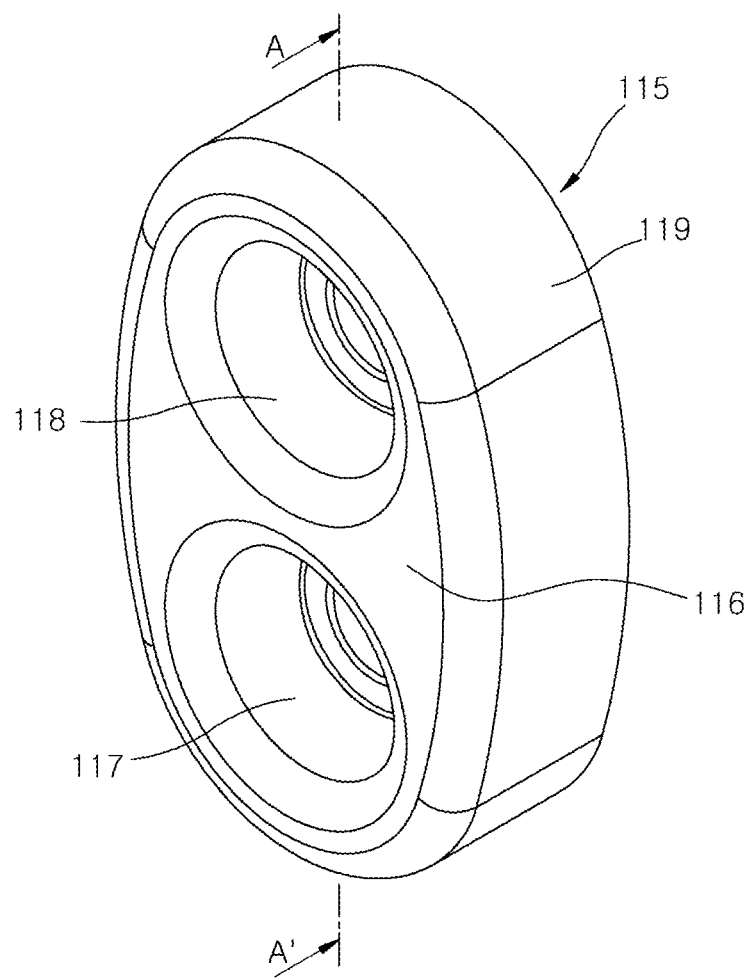
FIG. 7 is a perspective view illustrating a foreign matter introduction prevention part of the drum brake apparatus in accordance with the embodiment of the present disclosure.
Figure 8:
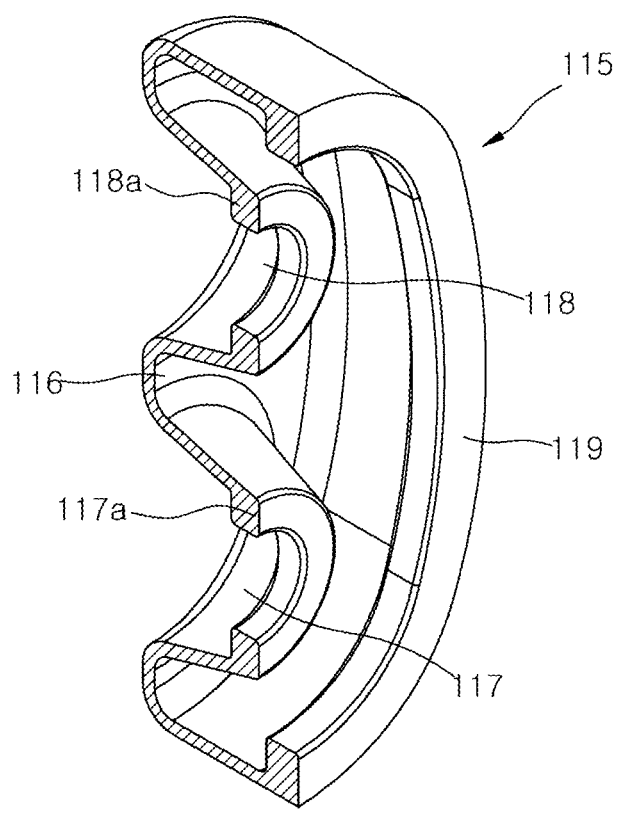
FIG. 8 is a cross-sectional view taken along the line A-A' of FIG. 7.

FIG. 7 is a perspective view illustrating the foreign matter introduction prevention part of the drum brake apparatus in accordance with the embodiment of the present disclosure, and FIG. 8 is a cross-sectional view taken along the line A-A' of FIG. 7.

The foreign matter introduction prevention part 115, as a device part which prevents foreign matters from being introduced into the piston receiving section 120 and the rod receiving section 130, is coupled to each side of the body part 111 at which openings of the piston receiving section 120 and the rod receiving section 130 are positioned. The opening of the piston receiving section 120 means each open side end of the piston receiving section 120, and the opening of the rod receiving section 130 means each open side end of the rod receiving section 130.

The foreign matter introduction prevention part 115 is made of a soft or flexible material, and is installed on the body part 111 to cover the opening of the piston receiving section 120 and the opening of the rod receiving section 130, in more detail, to cover a gap between the piston receiving section 120 and a piston 210 and a gap between the rod receiving section 130 and a push rod 332. Referring to FIGS. 7 to 8, the foreign matter introduction prevention part 115 in accordance with the embodiment of the present disclosure includes a sealing cover portion 116, a piston sealing portion 117, a rod sealing portion 118, and a body fixing portion 119.

The sealing cover portion 116 is disposed to cover a side of the body part 111. The piston sealing portion 117, as a device portion for sealing the piston receiving section 120, is formed under the sealing cover portion 116 in a ring shape to be hollow. The rod sealing portion 118, as a device portion for sealing the rod receiving section 130, is formed on the sealing cover portion 116 in a ring shape to be hollow.

A circular hole corresponding to the edge of the opening of the piston receiving section 120 is formed in the piston sealing portion 117. Referring to FIG. 3, an inner end 117a of the piston sealing portion 117 is coupled with the main braking unit 200 across the opening of the piston receiving section 120. In more detail, the inner end 117a of the piston sealing portion 117 is airtightly connected with the piston 210 of the main braking unit 200 by being fitted into a first coupling groove 211 formed around the piston 210.

A circular hole corresponding to the edge of the opening of the rod receiving section 130 is formed in the rod sealing portion 118. Referring to FIG. 3, an inner end 118a of the rod sealing portion 118 is connected with the parking braking unit 300 across the opening of the rod receiving section 130. In more detail, the inner circumferential portion 118a of the rod sealing portion 118 is connected with the push rod 332 of the parking braking unit 300 by being fitted into a second coupling groove 333 formed around the push rod 332.

A fluid for creating a hydraulic pressure atmosphere may be introduced into the piston receiving section 120, and a lubricant for smooth operations of a bevel gear section 320 and a rod section 330 may be introduced into the rod receiving section 130. The piston sealing portion 117 and the rod sealing portion 118 may prevent the fluid and lubricant in the piston receiving section 120 and the rod receiving section 130 from leaking to the outside through the openings and at the same time prevent foreign matters from being introduced into the main braking unit 200 and the parking braking unit 300.

The body fixing portion 119, as a device portion which is coupled with the body part 111, has a ring shape which continuously extends along an edge portion of the sealing cover portion 116, and is formed to project toward the body part 111. Referring to FIG. 6, by fitting and fixing the body fixing portion 119 into a third coupling groove 111a formed around the body part 111, the sealing cover portion 116, the piston sealing portion 117 and the rod sealing portion 118 may be firmly coupled to the body part 111.

By the above-described structure, the foreign matter introduction prevention part 115 serves to prevent the main braking unit 200 from being released to the outside of the piston receiving section 120 and at the same time prevent the parking braking unit 300 from being released to the outside of the rod receiving section 130, while not hindering the operations of the main braking unit 200 and the parking braking unit 300.

Referring to FIGS. 5 and 6, the piston receiving section 120 in accordance with the embodiment of the present disclosure includes the cylinder part 121 and the hydraulic flow path part 122.

The cylinder part 121, as a space part in which the main braking unit 200 is received, is formed in the housing section 110 to have a circular space shape. The cylinder part 121 is formed to cross the housing section 110 in a left-and-right direction, and is formed to be open at both ends thereof on both sides of the housing section 110. The hydraulic flow path part 122, as a part which forms a fluid supply path for creating a hydraulic pressure atmosphere in the cylinder part 121, is formed to extend from an outer surface of the housing section 110 to the cylinder part 121.

An outer end of the hydraulic flow path part 122 is formed to be open at the movement preventing portion 113 which is defined on a rear surface of the body part 111. Since the movement preventing portion 113 is exposed to the rear of the back plate 5 through the through hole 6, the fluid may be stably supplied into the cylinder part 121 through the hydraulic flow path part 122 from the rear of the back plate 5 without interference with a plurality of parts including the pair of shoes 2 installed on the front side of the back plate 5.

An inner end of the hydraulic flow path part 122 which communicates with the cylinder part 121 is formed to face an elastic member 220 of the main braking unit 200 which is installed in the cylinder part 121. The separation distance between the pair of left and right hydraulic flow path parts 122 gradually decreases from the outer ends thereof toward the inner ends thereof in such a way to define a V-shape. Accordingly, the fluid introduced into the hydraulic flow path parts 122 flows toward the elastic member 220 disposed at a middle portion of the cylinder part 121.

By such a structure of the hydraulic flow path part 122, the fluid introduced into the cylinder part 121 may be evenly distributed and diffused in the cylinder part 121 while being interfered with the elastic member 220, which makes it possible to prevent the fluid from concentratedly and repeatedly applying shock to an inner wall of the cylinder part 121 or a side of the piston 210 while the fluid is introduced into the cylinder part 121.

Referring to FIGS. 5 and 6, the rod receiving section 130 in accordance with the embodiment of the present disclosure includes a rod cylinder part 131 and a driving shaft receiving part 132.

The rod cylinder part 131, as a space part in which the rod section 330 of the parking braking unit 300 and a driven gear 322 of the bevel gear section 320 are received, is formed in the housing section 110 to have a circular space shape. The rod cylinder part 131 is disposed parallel to the cylinder part 121 while crossing the housing section 110 in the left-and-right direction, in other words, in a tangential direction with respect to a rotation center C2 of the back plate 5, a and is formed to be open at both ends thereof on both sides of the housing section 110.

The driving shaft receiving part 132, as a space part in which a driving gear 321 of the bevel gear section 320 of the parking braking unit 300 and the output shaft of the actuator 310 are received, is formed to communicate with the rod cylinder part 131. The output shaft of the actuator 310 is inserted into the inside of the housing section 110 through the driving shaft receiving part 132, and is connected with the bevel gear section 320 of the parking braking unit 300.

The rod cylinder part 131 is disposed with the predetermined distance from the piston receiving section 120. The distance between the rod cylinder part 131 and the piston receiving section 120 may be applied by being freely changed within a range in which the rod cylinder part 131 and the piston receiving section 120 do not interfere and communicate with each other. The more the distance between the rod cylinder part 131 and the piston receiving section 120 is decreased, the more a volume and weight of the housing section 110 may be reduced.

The above-described structure may realize size reduction to a degree that is impossible to realize in the conventional art in which a main brake device and a parking brake device are separately provided and thus a thickness of a casing of the main brake device, a thickness of a casing of the parking brake device and a clearance between the main brake device and the parking brake device are all reflected.

Referring to FIGS. 1 and 3, the main braking unit 200 in accordance with the embodiment of the present disclosure includes the piston 210 and the elastic member 220.

The piston 210 presses or releases the shoe 2 against or from a drum (not illustrated) while being moved into and out of the cylinder part 121 along the cylinder part 121 by a hydraulic pressure. In the embodiment of the present disclosure, a pair of left and right pistons 210 are disposed at both ends, respectively, of the cylinder part 121. The first coupling groove 211 and a shoe coupling part 212 are formed on an end portion of each piston 210 which is exposed out of the cylinder part 121.

The first coupling groove 211 is formed in a circular shape along an outer circumferential surface of the piston 210, and the inner end 117a of the piston sealing portion 117 is fitted and coupled into the first coupling groove 211. As the inner end 117a of the piston sealing portion 117 is fitted and fixed into the first coupling groove 211, the cylinder part 121 is sealed. The shoe coupling part 212 has a slit shape, that is, a clamp shape, into which an end of the shoe 2 may be inserted, and is installed to be engaged with the shoe 2.

When the fluid is introduced through the hydraulic flow path part 122, as a pressure in the cylinder part 121 increases, the pair of left and right pistons 210 are moved such that a separation distance between the pair of left and right pistons 210 is increased, and push the pair of left and right shoes 2. Through this process, main braking is performed. When the fluid is discharged through the hydraulic flow path part 122, as a pressure in the cylinder part 121 decreases, the pair of left and right pistons 210 are moved such that a separation distance between the pair of left and right pistons 210 is decreased, and release a pushed state of the pair of left and right shoes 2. Through this process, the main braking is released.

The elastic member 220 is disposed in the cylinder part 121 between the pair of pistons 210. As the elastic member 220 is disposed between the pair of pistons 210, the elastic member 220 prevents the pair of pistons 210 from directly colliding with each other while the pair of pistons 210 return to the inside of the cylinder part 121, and reduces an impact force applied to the pistons 210. Furthermore, as the elastic member 220 interferes with the fluid introduced between the pair of pistons 210 through the hydraulic flow path part 122, the elastic member 220 may evenly distribute and diffuse a hydraulic pressure. As the elastic member 220, an elastic spring or the like may be applied.

Referring to FIGS. 1 and 3, the parking braking unit 300 in accordance with the embodiment of the present disclosure includes the actuator 310, the bevel gear section 320, and the rod section 330.

The bevel gear section 320, as a device section which receives a rotational driving force from the actuator 310 and transfers the rotational driving force to the rod section 330, has a bevel gear structure and is disposed in the rod receiving section 130. The bevel gear section 320 in accordance with the embodiment of the present disclosure has a structure in which the driving gear 321 and the driven gear 322 are disposed on the same horizontal line.

The driving gear 321 has the structure of a bevel gear and is connected with the output shaft of the actuator 310 on the same shaft. The output shaft of the actuator 310 and the driving gear 321 are installed by being inserted into the driving shaft receiving part 132. The driving gear 321, more specifically, a rotation center C3 of the driving gear 321, is disposed parallel to an extension line of the rotation center C2 of the back plate 5.

The driven gear 322 has the structure of a bevel gear which is meshed with the driving gear 321, is disposed in the middle of the rod cylinder part 131, and is disposed on the same horizontal line as the driving gear 321. Namely, the driven gear 322 is disposed perpendicularly to the driving gear 321 on an extension line of the rotation center C3 of the driving gear 321.

The driven gear 322 is disposed in the rod cylinder part 131 parallel to the main braking unit 200. In more detail, the driven gear 322 is disposed on the same radial extension line as the main braking unit 200 with respect to the rotation center C2 of the back plate 5, and is disposed in the tangential direction with respect to the rotation center C2 of the back plate 5.

The driven gear 322 is meshed with the driving gear 321 while having a larger diameter and a larger number of gear teeth than the driving gear 321, and thereby, realizes together with the driving gear 321 a deceleration of an output of the actuator 310. Further, as the driven gear 322 is disposed perpendicularly to the driving gear 321, a rotation direction of the driven gear 322 becomes parallel to the rod section 330 and is transferred to the rod section 330.

The rod section 330 converts a rotational displacement of the bevel gear section 320 into a linear displacement and transfers the linear displacement to the shoe 2. The rod section 330 in accordance with the embodiment of the present disclosure includes a rotation rod 331 and the push rod 332, and is installed in the rod cylinder part 131.

The rotation rod 331 has a rod shape extending in a direction parallel to the main braking unit 200, and is connected with the driven gear 322 on the same shaft. The rotation rod 331 is formed on one side and the other side of the driven gear 322 to extend in an axial direction, and external threads are formed on outer surface portions of the rotation rod 331 to be symmetrical to each other based on the driven gear 322.

The driven gear 322 and the rotation rod 331 may be integrally connected. When the driven gear 322 and the rotation rod 331 are integrally formed, the parking braking unit 300 may be configured with a smaller number of parts and a small volume. As a consequence, the manufacturing cost may be reduced and the productivity may be improved, and power transfer from the driving gear 321 to the push rod 332 may be more stably carried out.

The push rod 332 has an internal thread which is threadedly coupled with the rotation rod 331, and is coupled around each end portion of the rotation rod 331. The push rod 332 is linearly moved into and out of the rod cylinder part 131 in association with the rotation of the rotation rod 331, and presses or releases the shoe 2 against or from the drum.

By applying the bevel gear section 320, having the above-described configuration, as means for transferring an electromotive force of the actuator 310 to the rod section 330, an extension line of the rotation center C3 of the driving gear 321 and a rotation axis of the driven gear 322 may be disposed on the same horizontal line with respect to a radial extension line L1. That is to say, the driving gear 321 and the driven gear 322 may be disposed together on one horizontal line parallel to the main braking unit 200.

In an example in which worm wheel gears are applied as means for transferring an electromotive force of the actuator 310 to the rod section 330, the worm gear as driving gear means cannot help but be disposed to vertically overlap with the wheel gear as driven gear means. Accordingly, a rotation axis of the main braking unit 200 (a first row), a rotation axis of the wheel gear (a second row) and a rotation axis of the worm gear (a third row) (see a rotation center C4 of the worm gear in FIG. 10) are disposed at different positions on the same radial extension line L1.

In other words, according to the bevel gear section 320 in accordance with the embodiment of the present disclosure, it is possible to realize a layout of a two-row structure including a first row corresponding to a rotation axis of the main braking unit 200 and a second row corresponding to rotation axes of the driving gear 321 and the driven gear 322. As a consequence, compared to a case where a three-row structure is realized when worm wheel gears are applied, it is possible to significantly reduce volumes of the parking braking unit 300 and the housing 100 receiving the parking braking unit 300. Accordingly, it is possible to realize size and weight reduction and further improve space utilization efficiency.

In further detail, an upper end position (see L3 in FIG. 10) of the housing 100 according to the application of the bevel gear section 320 becomes significantly lower than an upper end position (see L4 in FIG. 10) of the housing 100 when the worm wheel gears are applied. In other words, it is possible to realize the size and weight reduction of the housing 100 corresponding to the difference between L3 and L4 in FIG. 10.

Moreover, by applying the bevel gear section 320 in accordance with the embodiment of the present disclosure, compared to the example in which the worm wheel gears are applied, the driving gear 321 may be disposed closer to the main braking unit 200, which means that the actuator 310 connected with the driving gear 321 on the same shaft may be disposed closer to the rotation center C2 of the back plate 5. Accordingly, the degree of freedom in layout including the disposition of the actuator 310 may be further improved.

In the embodiment of the present disclosure, a pair of left and right push rods 332 are disposed at both end portions, respectively, of the rod cylinder part 131. An end portion of each push rod 332, which is exposed out of the rod cylinder part 131, has the same structure as the end portion of the piston 210 which is formed with the first coupling groove 211 and the shoe coupling part 212. As the inner end 118*a* of the rod sealing portion 118 is fitted and fixed into the second coupling groove 333 formed on the outer circumferential surface of the push rod 332, the rod cylinder part 131 is sealed by the rod sealing portion 118. The end portion of the push rod 332 has a slit shape into which an end of the shoe 2 may be inserted, and is installed to be engaged with the shoe 2.

When the actuator 310 is driven in a forward direction, a rotational force of the actuator 310 is transferred to the rotation rod 331 through the bevel gear section 320, and the rotation rod 331 is rotated in the forward direction in association with the bevel gear section 320. At this time, the pair of push rods 332 are moved along the rotation rod 331 such that a separation distance between the pair of push rods 332 is increased, and push the pair of left and right shoes 2.

In a state in which the pistons 210 press the shoes 2, parking braking is performed through the process described above. When the actuator 310 is driven in a backward direction, the pair of push rods 332 are moved such that a separation distance between the pair of push rods 332 is decreased, and release a pushed state of the pair of left and right shoes 2. Through such a process, the parking braking is released.

Figure 9B:
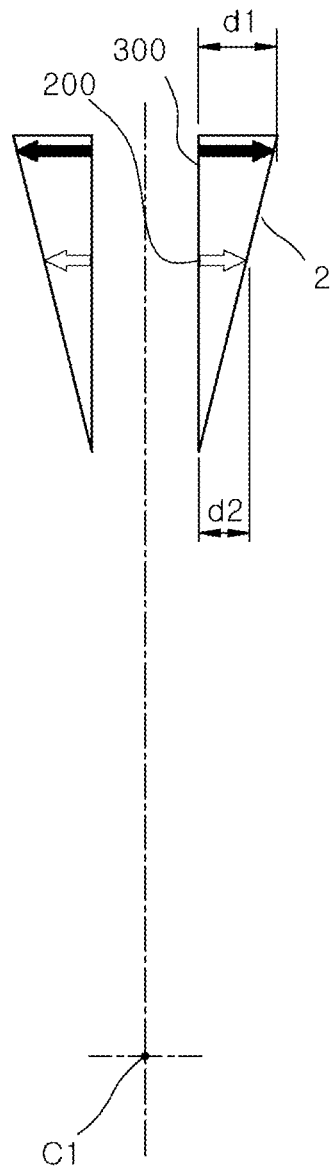
Figure 10:
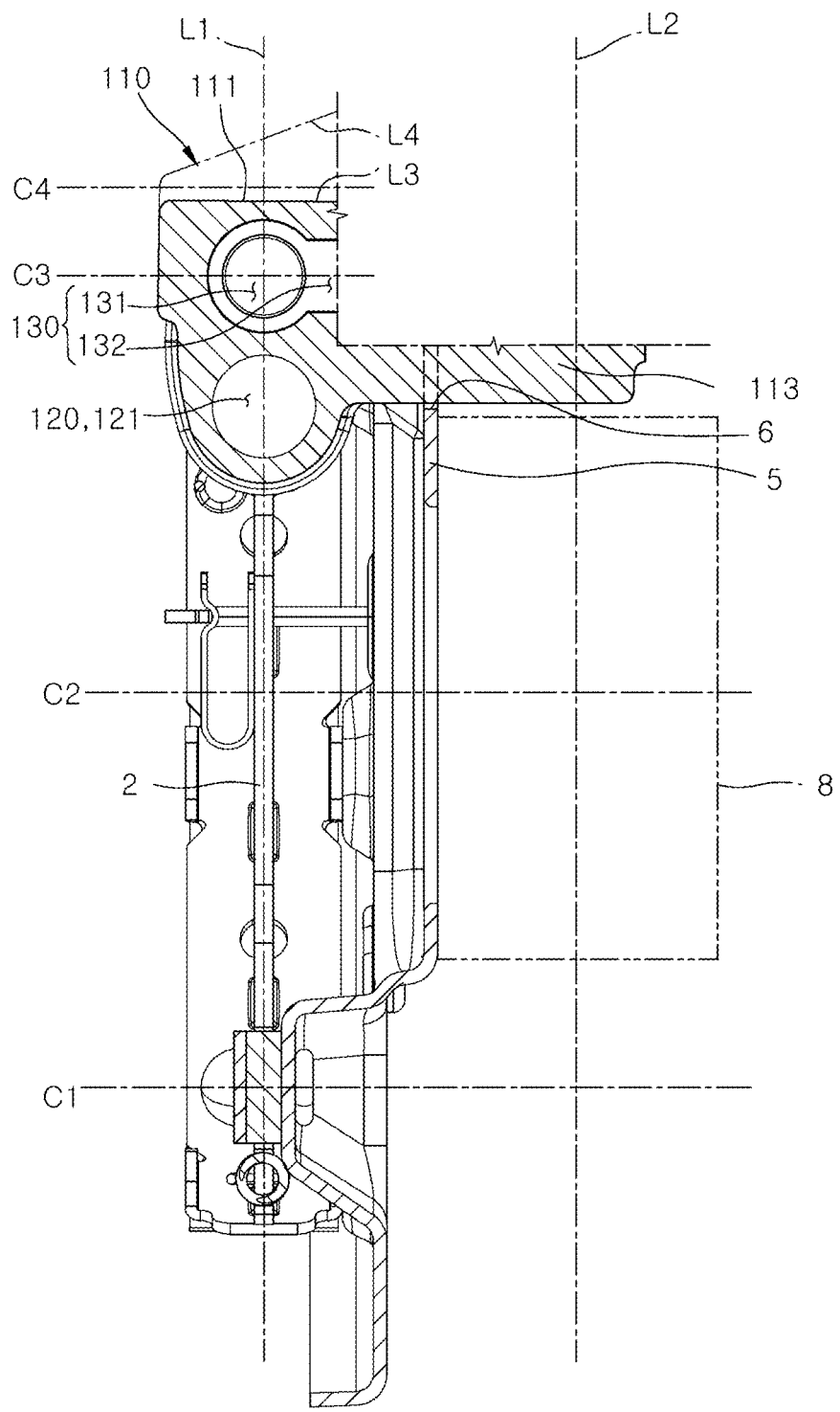
FIG. 10 is a cross-sectional view taken along the line B-B' of FIG. 1.

FIG. 9A and FIG. 9B are a conceptual view to assist in the explanation of tolerances depending on the disposition of the main braking unit and the parking braking unit in the drum brake apparatus in accordance with the embodiment of the present disclosure, and FIG. 10 is a cross-sectional view taken along the line B-B' of FIG. 1.

While a drum brake is used, a friction pad 3 attached to the shoe 2 is worn, and a gap between the shoe 2 and the drum (not illustrated) changes due to such wear of the friction pad 3. The gap between the shoe 2 and the drum may be calibrated by the parking braking unit 300 so as to be constantly maintained even though the friction pad 3 is worn.

A length of the parking braking unit 300 is flexibly changed depending on a driving state of the actuator 310, and a separation distance between the pair of shoes 2 may be substantially determined depending on a length of the parking braking unit 300 in a state in which the pair of shoes 2 are applied with a pressing force by an elastic member 7 in directions in which the pair of shoes 2 approach each other.

When the actuator 310 is driven in the forward direction, as a length of the parking braking unit 300 is increased to push the pair of left and right shoes 2 in opposite directions in which the pair of shoes 2 are separated from each other, the parking braking is performed. When the actuator 310 is driven in the backward direction, a pressing force which has pushed the shoes 2 is removed to release the parking braking. Depending on a driving amount of the actuator 310 in the backward direction, a gap between the shoe 2 and the drum may be adjusted and calibrated.

Referring to FIGS. 1 and 10, the rod receiving section 130 is disposed at a position separated farther than the piston receiving section 120 from a rotation center C1 of the shoe 2. This means that the parking braking unit 300 installed in the rod receiving section 130 is disposed at a position separated farther than the main braking unit 200, installed in the piston receiving section 120, from the rotation center C1 of the shoe 2.

FIG. 9A illustrates, in an example in which the main braking unit 200 is disposed at a position separated farther than the parking braking unit 300 from the rotation center C1 of the shoe 2, a relative size of a tolerance d2 of the main parking unit 200 with respect to a tolerance d1 of the parking braking unit 300. FIG. 9B illustrates, in the embodiment in which the parking braking unit 300 is disposed at a position separated farther than the main braking unit 200 from the rotation center C1 of the shoe 2, a relative size of the tolerance d2 of the main parking unit 200 with respect to the tolerance d1 of the parking braking unit 300.

In the case where the main braking unit 200 is disposed at a position separated farther than the parking braking unit 300 from the rotation center C1 of the shoe 2, if the tolerance d1 occurs when a return position of the shoe 2 or a gap between the shoe 2 and the drum is adjusted and calibrated by the parking braking unit 300 as described above, the tolerance d2 of the main braking unit 200 becomes larger than the tolerance d1 of the parking braking unit 300 (d2>d1) as illustrated in FIG. 9A.

As in the embodiment of the present disclosure, when the rod receiving section 130 is disposed at a position separated farther than the piston receiving section 120 from the rotation center C1 of the shoe 2, the tolerance d2 of the main braking unit 200 becomes smaller than the tolerance d1 of the parking braking unit 300 (d2<d1) as illustrated in FIG. 9A. Therefore, when the parking braking unit 300 has the tolerance d1 of the same degree with respect to the shoe 2, the main braking unit 200 has the smaller tolerance d2 in the embodiment of the present disclosure than that in the example in which the main braking unit 200 is disposed at a longer distance than the parking braking unit 300 from the rotation center C1 of the shoe 2.

By disposing the rod receiving section 130 at a position separated farther than the piston receiving section 120 from the rotation center C1 of the shoe 2, the tolerance d2 of the main braking unit 200 may be surely reduced with respect to the tolerance d1 of the parking braking unit 300 that occurs in the same degree, as described above. Accordingly, even when the tolerance d2 occurs in the course of calibrating a gap between the shoe 2 and the drum by the parking braking unit 300, the operational reliability of the main braking unit 200 may be stably maintained.

Referring to FIG. 10, the piston receiving section 120 and the rod receiving section 130 of the housing 100 are disposed on the one side (front surface side) of the back plate 5, and the actuator 310 is disposed on the other side (rear surface side) of the back plate 5. The back plate 5 is supported at the center portion thereof by a chassis 8 of a vehicle body, and the chassis 8 is disposed on the other side of the actuator 310.

By disposing the parking braking unit 300 at a position separated farther than the main braking unit 200 from the rotation center C1 of the shoe 2, the actuator 310 of the parking braking unit 300 may be disposed to be separated farther from a rotation center C2 of the back plate 5. Thus, the actuator 310 does not need to be disposed by being tilted in consideration of interference with the chassis 8, or a complicated structure, in which a stepped portion is formed on a portion of the housing section 110 facing the chassis 8, does not need to be applied.

In other words, when the actuator 310 is disposed on the same radial extension line L2 as the chassis 8 which supports the center portion of the back plate 5, the actuator 310 may not need to be tilted downward toward the front in order to minimize the interference with the chassis 8, and may be disposed parallel to the rotation center C2 of the back plate 5.

Therefore, without difficulties in design and fabrication for disposing the piston receiving section 120 and the rod receiving section 130 in a direction perpendicular to the output shaft of the actuator 310 by compositely considering an inclination of the actuator 310, the piston receiving section 120 and so forth, the piston receiving section 120 and the rod receiving section 130 may be easily disposed on the same radial extension line L1 with respect to the rotation center C2 of the back plate 5. Therefore, it is possible to further improve the manufacturability and processability of the housing 100 and to reduce the manufacturing cost.

Furthermore, by disposing the parking braking unit 300 at a position separated farther than the main braking unit 200 from the rotation center C1 of the shoe 2, it is possible to stably avoid interference with the chassis 8 when the actuator 310 is disposed. Therefore, a thickness of the housing section 110, in more detail, a thickness of a rear lower portion of the housing section 110 positioned between the actuator 310 and the chassis 8 (for example, a thickness, in a top-and-bottom direction, of the movement preventing portion 113) may be increased, thereby stably securing the stiffness of the housing section 110.

While the rod receiving section 130 in accordance with the embodiment of the present disclosure has a structure in which the rod receiving section 130 is disposed at a position separated farther than the piston receiving section 120 from the rotation center C1 of the shoe 2, this is nothing but a disclosure of an example in accordance with the present disclosure, and it is not intended to specifically limit positions of the rod receiving section 130 and the piston receiving section 120. As the occasion such as a structural or environmental condition demands, the piston receiving section 120 may be disposed at a position separated farther than the rod receiving section 130 from the rotation center C1 of the shoe 2.

This means that the parking braking unit 300 installed in the rod receiving section 130 is disposed at a position separated farther than the main braking unit 200, installed in the piston receiving section 120, from the rotation center C1 of the shoe 2.

A pair of left and right locking members 400 are provided to couple a pair of fastening locking portions 114, formed on a left side and a right side of the body part 111, and a pair of locking portions 311, formed on a left side and a right side of the actuator 310, to each other. By locking the pair of left and right locking members 400 as described above in a state in which the housing 100 and the actuator 310 are disposed in front and rear of the back plate 5, respectively, the actuator 310, the back plate 5 and the housing 100 may be firmly coupled to one another, and the housing 100 and the actuator 310 may be fastened at the predetermined position on the back plate 5.

As is apparent from the above description, the drum brake apparatus 1 according to the embodiments of the present disclosure, constructed as mentioned above, may disclose an integrated main braking and parking braking structure in which the main braking unit 200 and the parking braking unit 300 are coupled to each other in one housing 100. Thus, a main bake device and a parking brake device may be simultaneously installed through a simple process of installing the housing 100 on the back plate 5.

Therefore, according to the embodiments of the present disclosure, when compared to the conventional art in which a main brake device and a parking brake device are separately fabricated and managed, assembly positions capable of securing a clearance in consideration of the interference between the main brake device and the parking brake device are set and adjusted depending on a specification and then design and assembly are performed, a manufacturing process may be simplified and a gap between the main braking unit 200 and the parking braking unit 300 may be further decreased. As a consequence, it is possible to realize size and weight reduction and improve space utilization efficiency.

In addition, according to the embodiments of the present disclosure, by applying the bevel gear section 320 as power transmission means for receiving an electromotive force from the actuator 310, it is possible to realize a layout of a two-row structure including a first row corresponding to a rotation axis of the main braking unit 200 and a second row corresponding to rotation axes of the driving gear 321 and the driven gear 322.

Therefore, according to the embodiments of the present disclosure, compared to a case where a three-row structure is realized when a worm wheel gear is applied, it is possible to significantly reduce the volumes of the parking braking unit 300 and the housing 100 which receives the parking braking unit 300. As a consequence, it is possible to realize size and weight reduction and further improve space utilization efficiency.

Also, according to the embodiments of the present disclosure, compared to an example in which the worm wheel gear is applied, the driving gear 321 and the actuator 310 connected with the driving gear 321 on the same shaft may be disposed closer to the main braking unit 200, that is, closer to the rotation center C2 of the back plate 5, and thus, the degree of freedom of layout may be improved.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A drum brake apparatus comprising:
   a housing;
   a main braking unit disposed on a first portion of the housing, the main braking unit configured to be, during main braking, driven by a hydraulic pressure and pressing a shoe; and
   a parking braking unit disposed on a second portion of the housing, the parking braking unit configured to be, during parking braking, driven by an electromotive force of an actuator and to press the shoe, the parking braking unit comprising:
a bevel gear section disposed in the housing, the bevel gear section configured to rotate in association with the actuator, the bevel gear section comprising:
a driving gear connected with the actuator; and
a driven gear meshed with the driving gear; and
a rod section connected with the bevel gear section, the rod section disposed to be reciprocating in and out of the housing in association with the bevel gear section while pressing the shoe, the rod section comprising:
a rotation rod connected with the driven gear, wherein external threads are disposed on an outer surface of the rotation rod to be symmetrical to each other based on the driven gear,
wherein the main braking unit is disposed closer to a rotation center of a back plate than the parking braking unit.

2. The drum brake apparatus according to claim 1, wherein the
driven gear is disposed on the same horizontal line as the driving gear, and threadedly coupled with the rod section via the rotation rod.

3. The drum brake apparatus according to claim 2, wherein the driving gear is disposed parallel to the rotation center of the back plate, and
wherein the driven gear is disposed on a same radial extension line as the main braking unit with respect to the rotation center of the back plate.

4. The drum brake apparatus according to claim 2, wherein the rod section further comprises:
a push rod threadedly coupled around the rotation rod, and disposed to be reciprocating in and out of the housing in association with rotation of the rotation rod, and
wherein the rotation rod is connected with the driven gear on a same shaft.

5. The drum brake apparatus according to claim 1, wherein the housing comprises a housing body which includes:
a piston receiving body at a first side of the housing body, the piston receiving body having a hollow structure in which the main braking unit is disposed; and
a rod receiving body at a second side of the housing body, the rod receiving body having a hollow structure in which the parking braking unit is disposed.

6. The drum brake apparatus according to claim 5, wherein the housing body further comprises:
a body part integrally connected with the piston receiving body and the rod receiving body;
a fastening part disposed on the body part to be fastened to the back plate; and
a foreign matter introduction prevention part configured to be coupled to a side of the body part having openings of the piston receiving body and the rod receiving body, the foreign matter introduction prevention part configured to cover an edge portion of the piston receiving body and an edge portion of the rod receiving body.

7. The drum brake apparatus according to claim 6, wherein the fastening part comprises:

a fastening locking portion defined at each side of the body part, and configured to be fastened to the back plate together with the actuator by a locking member; and
a movement preventing portion protruding on the body part so as to correspond to the main braking unit and extend through a through hole of the back plate.

8. The drum brake apparatus according to claim 6, wherein the foreign matter introduction prevention part comprises:
a sealing cover disposed to cover a side of the body part;
a piston sealing portion having a hollow structure at a first side of the sealing cover, an edge of the piston sealing portion connected with the main braking unit;
a rod sealing portion having a hollow structure at a second side of the sealing cover, an edge of the rod sealing portion connected with the parking braking unit; and
a body fixing portion continuously disposed along the edge of the sealing cover and fixedly connected to the body part.

9. The drum brake apparatus according to claim 5, wherein the piston receiving body comprises:
a cylinder, having a circular space, disposed in the housing body and accommodating the main braking unit; and
a hydraulic flow path, through which a fluid is supplied into the cylinder, extending from an outer surface of the housing body to the cylinder.

10. The drum brake apparatus according to claim 5, wherein the rod receiving body comprises:
a rod cylinder, having a circular space, disposed in the housing body and accommodating the parking braking unit; and
a driving shaft receiving part, through which an output shaft of the actuator extends and is connected to the parking braking unit, disposed at a predetermined distance from the piston receiving body and communicating with the rod cylinder part.

11. The drum brake apparatus according to claim 5, wherein the piston receiving body and the rod receiving body are disposed on the same radial extension line with respect to the rotation center of the back plate, and
wherein the actuator, which is disposed parallel to the rotation center of the back plate, is disposed on the same radial extension line as a chassis which is configured to support a center portion of the back plate.

12. The drum brake apparatus according to claim 1, wherein the main braking unit comprises:
a piston disposed at an end of the housing, and configured to reciprocate in and out of the housing by a hydraulic pressure so as to press the shoe; and
an elastic member disposed in the housing, the elastic member configured to reduce an impact force applied to the piston returning into the housing.

13. The drum brake apparatus according to claim 2, wherein the drum brake apparatus includes a first row corresponding to a rotation axis of the main braking unit and a second row corresponding to rotation axes of the driving gear and the driven gear.

14. The drum brake apparatus according to claim 1, wherein the driven gear and the rotation rod are integrally connected.

* * * * *